United States Patent
Saitou et al.

(10) Patent No.: US 9,908,490 B2
(45) Date of Patent: Mar. 6, 2018

(54) CONTROL SYSTEM FOR VEHICLE

(71) Applicants: CALSONIC KANSEI CORPORATION, Saitama (JP); MAZDA MOTOR CORPORATION, Hiroshima (JP)

(72) Inventors: Shinji Saitou, Saitama (JP); Kiyoshi Inori, Saitama (JP); Makoto Okitsu, Saitama (JP); Takuya Yoshinaga, Saitama (JP); Ryohei Kawabuchi, Hiroshima (JP); Takashi Hamada, Hiroshima (JP); Yuko Kawazoe, Hiroshima (JP); Kazuki Fujihara, Hiroshima (JP); Hiroki Ichida, Hiroshima (JP)

(73) Assignees: CALSONIC KANSEI CORPORATION, Saitama (JP); MAZDA MOTOR CORPORATION, Hiroshima (JP)

( * ) Notice: Subject to any disclaimer, the term of this patent is extended or adjusted under 35 U.S.C. 154(b) by 216 days.

(21) Appl. No.: 14/740,461

(22) Filed: Jun. 16, 2015

(65) Prior Publication Data
US 2015/0367738 A1   Dec. 24, 2015

(30) Foreign Application Priority Data

Jun. 18, 2014 (JP) ................... 2014-125835

(51) Int. Cl.
*B60R 16/03* (2006.01)

(52) U.S. Cl.
CPC .................... *B60R 16/03* (2013.01)

(58) Field of Classification Search
CPC ........ B60L 11/18; B60R 16/033; H05B 37/02
See application file for complete search history.

(56) References Cited

U.S. PATENT DOCUMENTS

| | | |
|---|---|---|
| 5,986,350 A | 11/1999 | Hirano |
| 2007/0273329 A1 | 11/2007 | Kobuse et al. |
| 2015/0363122 A1* | 12/2015 | Hasegawa ........... G06F 11/1441 711/154 |

FOREIGN PATENT DOCUMENTS

| | | |
|---|---|---|
| JP | 63-101147 A | 5/1988 |
| JP | 7-2060 A | 1/1995 |
| JP | 8-48195 A | 2/1996 |
| JP | 2009-161104 A | 7/2009 |
| JP | 2010-137748 A | 6/2010 |
| JP | 2012-11888 A | 1/2012 |
| JP | 2014-36529 A | 2/2014 |
| WO | 2006/059511 A1 | 6/2006 |

* cited by examiner

*Primary Examiner* — Jeffrey Shin
(74) *Attorney, Agent, or Firm* — Kenealy Vaidya LLP

(57) ABSTRACT

A control system for a vehicle includes: a battery; a first control unit configured to receive a power supplied from the battery, and configured to control a first control object which is mounted on the vehicle; and an interrupting unit configured to interrupt a supply of the power to the first control unit from the battery, wherein a first switch part is provided between the battery and the first control unit which receives a resumption request signal when the supply of the power to the first control unit is interrupted by the interrupting unit to permit the power to be supplied to the first control unit from the battery.

14 Claims, 3 Drawing Sheets

CONTROL SYSTEM FOR VEHICLE

BACKGROUND

1. Field of the Invention

The present invention relates to a control system for a vehicle which controls a control object of the vehicle by a control unit having a microcomputer.

2. Description of the Related Art

In a control system for a vehicle, in some cases, a feeble electric current may be supplied to a control unit to maintain a waiting function of, for instance, a keyless entry device even under a state that the vehicle is not driven, or a useless electric current may be supplied to the control unit due to other causes. When a state that an engine is not driven, nor charged continues for a long period, for instance, during a parking of the vehicle for a long time or a transportation of the vehicle, there is a fear that a battery may be completely discharged, namely, what is called, the battery may be dead.

In order to prevent the battery from dying, for instance, JP-A-2009-161104 proposes a control unit in which a fuse installed in a power supply line of a room lamp turned on in cooperation with a control object such as a door switch which is not used during a transportation of a vehicle or a parking of the vehicle for a long period is detached so that an electric current supplied to a room lamp system is assuredly prevented.

Further, JP-A-2010-137748 discloses a structure that a first path having an opening part to which a fuse can be attached and a second path having a relay circuit as well as an opening part are provided in parallel between a battery and an ECU, the fuse is attached to the opening part of the first path to constantly supply a power to the ECU, and, on the other hand, the fuse attached to the opening part of the first path is changed to the opening part of the second path to interrupt the power to the ECU.

A scene is supposed to occur that a power needs to be supplied to a control unit to make prescribed functions operate so as to temporarily drive a vehicle, for instance, when the vehicle is unloaded to a transportation vessel or a trailer even in the course of transportation of the vehicle.

However, in the control unit proposed in JP-A-2009-161104, the fuse is merely supposed to be attached again after the transportation or the parking of the vehicle for a long period is finished. Accordingly, a problem arises that a case of the control unit needs to be opened so as to reattach the fuse in order to resume a supply of a power for a temporary recovery of a function during a period of an interruption of the power, so that a troublesome labor is necessary.

On the other hand, in the structure disclosed in JP-A-2010-137748, even in the power interrupted state that the fuse is detached from the opening part of the first path, when a switch of the relay circuit is turned on, the power may be supplied to the ECU through the second path. Thus, the fuse does not need to be changed for the second path.

Further, JP-A-2010-137748 also discloses a structure as another example that a first path and a second path having a relay circuit are switched by a switch for switching so as to be connected to an ECU in place of replacement of the fuse.

However, in any case, a problem arises that since the supply of the power by the switch of the relay circuit is merely carried out while the switch is turned on, when a turning-on time by an operator is not enough to carry out a prescribed process in the ECU, a required function does not operate.

SUMMARY

It is an object of the present invention to provide a control system for a vehicle which can interrupt an electric current supplied to a control unit in order to prevent a battery from being dead during a transportation of the vehicle or a parking of the vehicle for long period and can easily resume a supply of power to the power interrupted control unit.

According to an aspect of the invention, there is provided a control system for a vehicle including: a battery; a first control unit configured to receive a power supplied from the battery, and configured to control a first control object which is mounted on the vehicle; and an interrupting unit configured to interrupt a supply of the power to the first control unit from the battery, wherein a first switch part is provided between the battery and the first control unit which receives a resumption request signal when the supply of the power to the first control unit is interrupted by the interrupting unit to permit the power to be supplied to the first control unit from the battery.

According to the present invention, the supply of the power to the control unit from the battery is interrupted by the interrupting unit. Thus, for instance, the battery of the vehicle which is parked for a long period can be prevented from being dead. Further, in the power interrupted state, the resumption request signal is applied to the switch part, so that the supply of the power can be easily resumed as required.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Now, exemplary embodiments of the present invention will be described below. In the exemplary embodiments, the present invention is applied to a control system for a vehicle including a plurality of control units set in accordance with control objects.

As the control objects by the control system for a vehicle, are exemplified, for instance, a keyless entry device, a driving device for opening and closing a door, navigation or an audio device, an air conditioner, a seat belt sensor, a rain sensor, a power window device and other various devices.

First Exemplary Embodiment

Figure 1:
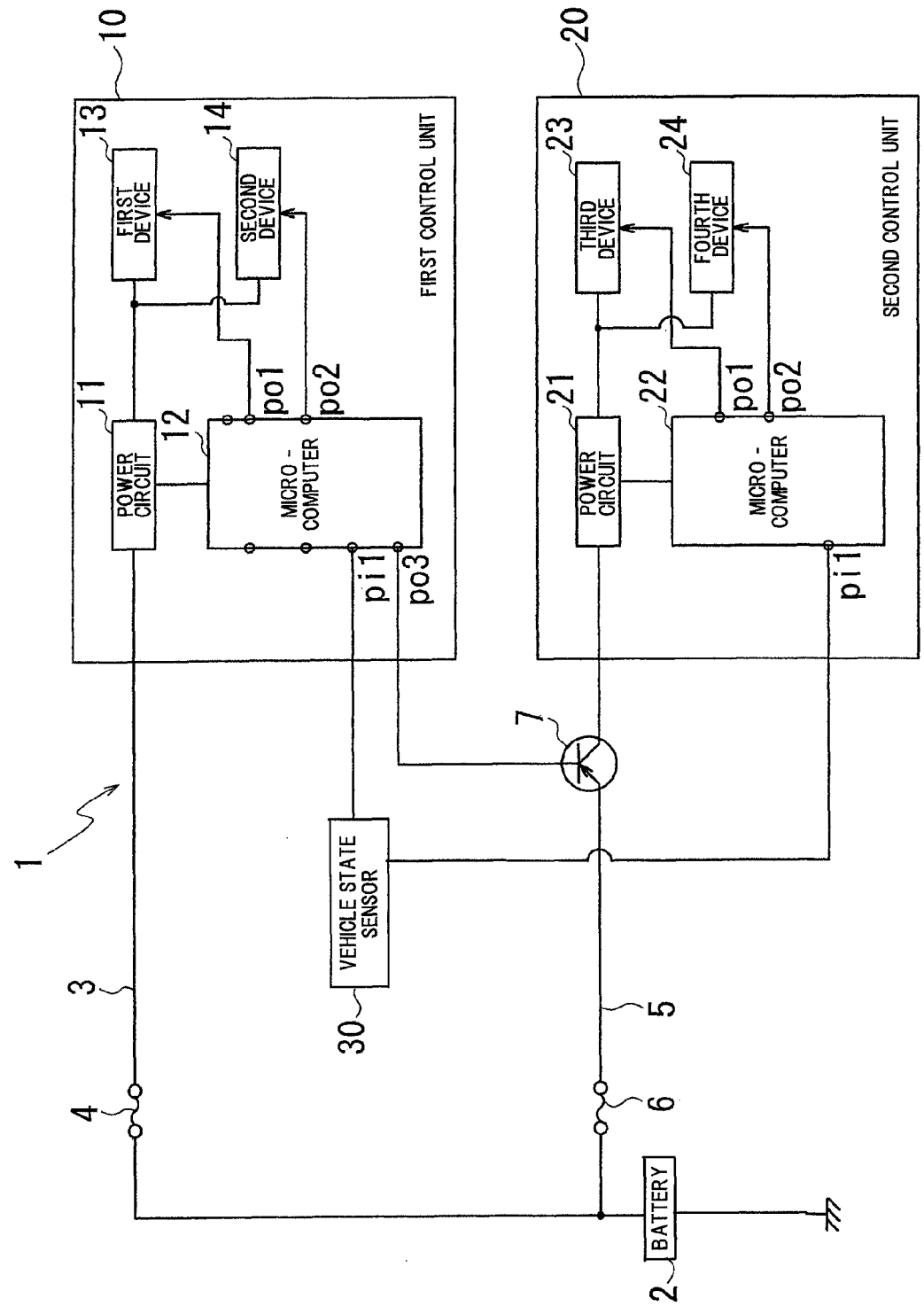
FIG. 1 is a block diagram showing a first exemplary embodiment of the present invention.

FIG. 1 is a block diagram showing a first exemplary embodiment in a mode for carrying out the invention.

The control system for a vehicle is formed with control units respectively corresponding to a plurality of groups which are obtained by dividing the above-described various control objects into groups. A method for dividing the control objects into the plurality of groups is suitably determined depending on, for instance, a quantity of consumed electric current, a frequency in use, a position where the device is installed and other points of view.

Here, for simplicity, the control system 1 for a vehicle is supposed to include a first control unit 10 having a first device 13 and a second device 14 set as the control objects and a second control unit 20 having a third device 23 and a fourth device 24 set as the control objects. The first device 13 and the second device 14 are devices which are desired to hold functions even during a transportation of the vehicle or a parking of the vehicle for a long period or to which an extremely feeble electric current is merely supplied even when a power is constantly supplied. The third device 23 and the fourth device 24 are devices which are desired to interrupt the power especially during the transportation or parking of the vehicle for a long period.

The first control unit 10 is connected to a battery 2 through a power supply line 3 having a fuse 4. The second control unit 20 is connected to the battery 2 through a power supply line 5 having a fuse 6.

The first control unit 10 includes a power circuit 11 and a microcomputer 12 to control the first device 13 and the second device 14.

The power circuit 11 generates an operating power of the microcomputer 12, the first device 13 and the second device 14 in accordance with the power from the battery through the fuse 4.

The control system 1 for a vehicle includes prescribed sensors or switches to detect an external environment of the vehicle or states of parts of the vehicle and a driving state of the vehicle or operating states thereof. Here, the prescribed sensors or switches are collectively designated as a vehicle state sensor 30.

The microcomputer 12 carries out a prescribed determining process in accordance with an input signal from the vehicle state sensor 30 to output control signals from first and second output terminals po1 and po2 to the first device 13 or the second device 14. In FIG. 1, a terminal which receives the input signal from the vehicle state sensor 30 is representatively designated by one first input terminal pi1.

The first device 13 and the second device 14 receive a supply of the power from the power circuit 11 and operate in accordance with the control signals from the microcomputer 12.

The second control unit 20 includes a power circuit 21 and a microcomputer 22 like the first control unit 10 to control the third device 23 and the fourth device 24.

The power supply line 5 to the second control unit 20 includes a transistor 7 as well as the fuse 6. The transistor 7 is a PNP type in which an emitter is connected to the fuse 6 side, a collector is connected to the power circuit 21 side and a base is connected to a third output terminal po3 of the microcomputer 12 of the first control unit 10.

Namely, the microcomputer 12 of the first control unit 10 controls the first device 13 and the second device 14, and, on the other hand, controls the transistor 7 by a power control signal in accordance with the state of the vehicle.

When the power control signal to the base from the microcomputer 12 of the first control unit 10 indicates L (Low), the transistor 7 is turned on (ON). When the power control signal indicates H (high), the transistor 7 is turned off (OFF).

The states of the vehicle for which the transistor 7 is turned on/off include states that the vehicle is driven, the vehicle is parked and the vehicle is parked for a long period. Accordingly, in objects to be detected by the vehicle state sensor 30, are included, for instance, a position of an ignition switch, a vehicle speed, a parking brake, a range position of a transmission, a door switch or the like.

When the transistor 7 is turned on, in the second control unit 20, the power circuit 21 inputs the power from the battery to generate an operating power of the microcomputer 22, the third device 23 and the fourth device 24.

Thus, the microcomputer 22 carries out a prescribed determining process in accordance with an input signal from the vehicle state sensor 30 which is received by an input terminal pi1 thereof to output control signals from first and second output terminals po1 and po2 to the third device 23 or the fourth device 24. The third device 23 and the fourth device 24 receive a supply of the power from the power circuit 21 and operate in accordance with the control signals from the microcomputer 22.

As a matter of course, a control by the microcomputer 22 includes a mode that one of the third device 23 and the fourth device 24 is operated, and an operation of the other is stopped in accordance with the state of the vehicle.

Further, the microcomputer 22 (and the microcomputer 12) themselves may have, what is called a sleep mode that a restricted process is merely carried out, for instance, at prescribed time intervals in accordance with the state of the vehicle.

In the present embodiment, when the transistor 7 is turned off, the power of the second control unit 20 is completely interrupted, so that an electric current is not supplied to the microcomputer 22, the third device 23 and the fourth device 24 from the power circuit 21. Thus, all functions are stopped by exceeding the sleep mode.

In the above-described structure, an operation will be described below, for instance, when the first device 13 is supposed to be the keyless entry device, the second device 14 is supposed to be the air conditioner, the third device 23 is supposed to be the navigation device and the fourth device 24 is supposed to be a power seat device.

The microcomputer 12 of the first control unit 10 determines that the vehicle is driven in accordance with the input signal from the vehicle state sensor 30, for instance, when the ignition switch indicates ON and the vehicle speed is not zero. When the ignition switch indicates ON or ACC (accessory) and the vehicle speed is zero, the microcomputer 12 determines that the vehicle is stopped. When the ignition switch indicates OFF and the parking brake is turned on or the range position indicates P (parking), the microcomputer 12 determines that the vehicle is parked. Further, when the parking state continues for a prescribed time or more, the microcomputer 12 determines that the vehicle is parked for a long period.

During a state of transition which a state that the vehicle is driven shifts to a state that the vehicle is parked, the microcomputer 12 sets the power control signal from the third output terminal po3 of the microcomputer 12 to L to turn on the transistor 7 and supply the power from the battery 2 to the control unit 20.

Since the power is constantly supplied to the first control unit 10, when the first device 13 (a keyless circuit) is in a stand-by state, if a request is sent from a keyless terminal during the parking of the vehicle, a door lock is locked/unlocked. Further, the second device 14 (the air conditioner) can be used when the ignition switch is turned on.

In the second control unit 20 to which the power is supplied when the transistor 7 is turned on, the third device 23 (the navigation device) and the fourth device 24 (the power seat device) can be used under a state that the ignition switch indicates ON or ACC.

Then, when the microcomputer 12 determines that the vehicle is parked for a long period, the microcomputer 12 sets the power control signal to H to turn off the transistor 7 and interrupt the supply of the power to the second control unit 20.

Thus, a useless electric current is completely prevented from being supplied to a control system related to the third device 23 and the fourth device 24 including the microcomputer 22 which have no probability of being used when the vehicle is parked for a long time.

Then, even when the vehicle is parked for a long time, since the power is supplied to the first control unit 10 so that the first device 13 (the keyless circuit) functions, a driver can unlock a door to get on the vehicle. Accordingly, since when the ignition switch is turned on, the state of the vehicle changes. Thus, the microcomputer 12 of the first control unit 10 switches the power control signal to L from H to turn on the transistor 7. Thus, the supply of the power to the second control unit 20 is resumed.

Further, as another mode, the microcomputer 12 receives a door unlocking request signal by the keyless circuit to determine a change of the state of the vehicle without waiting for a turning on operation of the ignition switch, so that the microcomputer can switch the power control signal to L from H.

In the present exemplary embodiment, when the second control unit 20, having the third device 23 and the fourth device 24, is corresponding to a first control unit, the third device 23 and the fourth device 24 are corresponding to a first control object, the microcomputer 12 is corresponding to a vehicle state determining unit, and the transistor 7 is corresponding to a first switch part.

Then, a structure that the microcomputer 12 sets the power control signal to the base to H, to turn off the transistor 7, corresponds to an interrupting unit. Particularly, the power control signal H from the microcomputer 12 corresponds to an interrupting signal and the power control signal L corresponds to a resumption request signal.

The first control unit 10, having the microcomputer 12, is corresponding to a constant power supply control unit. And, the first device 13 and the second device 14 are corresponding to a second control object which is different from the first control object.

The first exemplary embodiment is formed in such a way as described above. In the control system 1 for a vehicle including the battery 2 and the second control unit 20 to which the power is supplied from the battery 2 to control the third device 23 and the fourth device 24 which are mounted on the vehicle, the transistor 7 which is turned on when the power control signal L is received during an interruption of the supply of the power to the second control unit 20 to permit the power to be supplied is provided between the battery 2 and the second control unit 20. Accordingly, for instance, even when the supply of the power to the second control unit 20 is completely interrupted to prevent the battery from being dead, for instance, during the parking of the vehicle for a long period, the supply of the power can be easily resumed by the power control signal L in accordance with a temporary necessity.

Since the power control signal H is given to the transistor 7 depending on the state of the vehicle to interrupt the supply of the power to the second control unit 20, and the power control signal L is also given to the transistor 7 depending on the state of the vehicle, a process which prevents the battery from being dead is carried out without requiring a special operation and the supply of the power to the second control unit 20 is resumed at a suitable time.

Especially, since the microcomputer 12 of the first control unit 10 to which the power is constantly supplied from the battery 2 determines the state of the vehicle to determine the power control signal to the transistor 7, a highly accurate and proper power control is carried out.

Further, since the microcomputer 12 of the first control unit 10 to which the power is constantly supplied controls the first device 13 and the second device 14 which are different from the third device 23 and the fourth device 24 as the control objects of the second control unit 20, when the devices as the control objects are divided into groups, the function of the first device 13 or the second device 14 can be held even during the interruption of the supply of the power to the second unit 20.

In the present exemplary embodiment, the transistor 7 is supposed to be the PNP type and turned on when the base thereof is set to an L level. However, the transistor 7 may be an NPN type. In that case, output modes of the power control signal from the microcomputer 12 may be reversed.

Further, the present invention is not limited to the transistor 7 and, for instance, a relay which serves as a switching may be used.

Second Exemplary Embodiment

In the first exemplary embodiment, the supply of the power to the second control unit is supposed to be interrupted in accordance with a prescribed state of the vehicle so as to prevent the useless electric current from being consumed. Similarly, the supply of the power is supposed to be resumed in accordance with the state of the vehicle. However, in the first control unit to which the power is constantly supplied, when a device an operation of which is not necessary is included in the control objects during the parking of the vehicle for a long period, there is a fear that the useless electric current may be possibly supplied to the device.

Thus, a second exemplary embodiment will be described below in which electric power consumption is more reduced likewise in the first control unit.

Figure 2:
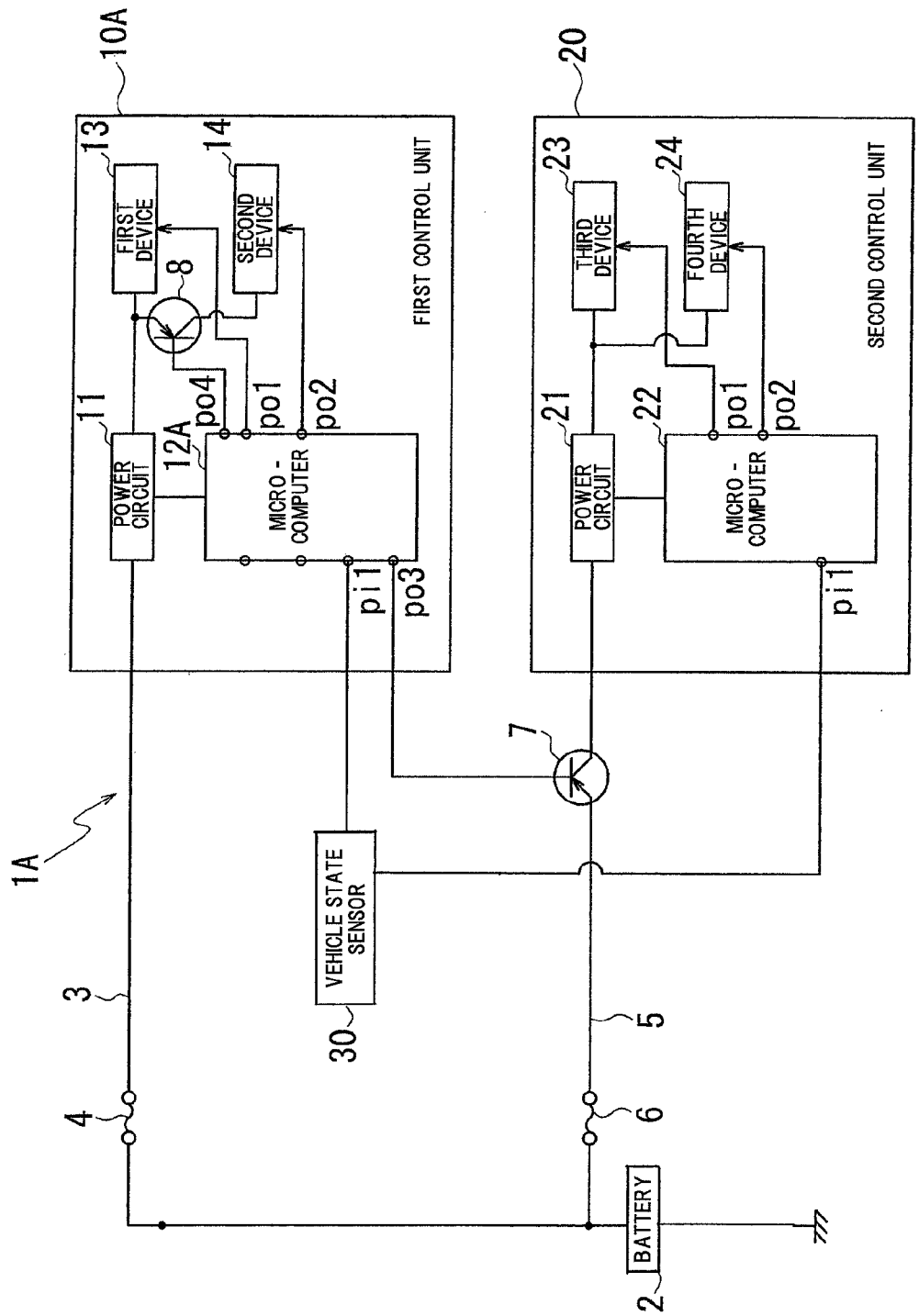
FIG. 2 is a block diagram showing a second exemplary embodiment of the present invention.

FIG. 2 is a block diagram showing the second exemplary embodiment.

A control system 1A for a vehicle is supposed to include a first control unit 10A having a first device 13 and a second device 14 set as control objects and a second control unit 20 having a third device 23 and a fourth device 24 set as control objects.

The first control unit 10A receives a supply of a power through a power supply line 3 having a fuse 4. The second control unit 20 receives a supply of a power through a power supply line 5 having a fuse 6 and a transistor 7.

The first control unit 10A includes a power circuit 11 and a microcomputer 12A to control the first device 13 and the second device 14.

The power circuit 11 generates an operating power of the microcomputer 12A, the first device 13 and the second device 14 in accordance with the power from a battery 2.

Here, the second device 14 is supposed to have no probability of being used when the vehicle is parked for a long time. Thus, a transistor 8 is provided between the power circuit 11 and the second device 14. In the transistor 8, an emitter thereof is connected to the power circuit 11 side, a collector is connected to the second device 14 side and a base is connected to a fourth output terminal po4 of the microcomputer 12A which outputs a second power control signal.

From a third output terminal po3 of the microcomputer 12A, a power control signal is outputted to the transistor 7 of the power supply line 5 to the second control unit 20.

The second control unit 20 and other structures are the same as those of the first exemplary embodiment.

The microcomputer 12A ordinarily sets the second power control signal from the fourth output terminal po4 to L to turn on the transistor 8. The microcomputer 12A carries out a prescribed determining process in accordance with an input signal received by a first input terminal pi1 from a vehicle state sensor 30 to output control signals from first and second output terminals po1 and po2 to the first device 13 and the second device 14. Thus, the first device 13 and the second device 14 respectively receive the supply of the power from the power circuit 11 and operate in accordance with the control signals from the microcomputer 12A.

When the microcomputer 12A especially determines that the vehicle is parked for a long period, the microcomputer 12A sets the power control signal from the third output terminal po3 to H to turn off the transistor 7 and also sets the second power control signal from the fourth output terminal po4 to H to turn off the transistor 8. Thus, the supply of the power to the second control unit 20 is interrupted and the supply of the power to the second device 14 is also interrupted in the first control unit 10A.

Thus, the electric power consumption is more suppressed when the vehicle is parked for a long time than that of the first exemplary embodiment. Further, since the power is supplied to the first control unit 10A so that, for instance, a keyless function is held in the first device 13, a driver can unlock a door lock to get on the vehicle at a necessary time.

In the present exemplary embodiment, the second device 14 of the first control unit 10A is corresponding to a prescribed control object. The transistor 8 is corresponding to a local switch.

Further, the second power control signal H is corresponding to a local interrupting signal, and a second power control signal L is corresponding to a local resumption request signal.

The second exemplary embodiment is formed in such a way as described above and initially has the same effects as those of the first exemplary embodiment.

Further, in the first control unit 10A, between the power circuit 11 and the second device 14, the transistor 8 is provided. The microcomputer 12A sends the second power control signal H to the transistor 8 in accordance with a state of the vehicle to interrupt the supply of the power to the second device 14 from the power circuit 11. On the other hand, the microcomputer 12A sends the second power control signal L to the transistor 8 to permit the power to be supplied to the second device 14. Accordingly, the electric power consumption is more suppressed to improve an effect which prevents the battery from being dead.

In the present exemplary embodiment, the transistor 7 may be formed as an NPN type in which output modes of the power control signal from the microcomputer 12A are reversed. Further, when the transistor 8 is similarly formed as an NPN type, output modes of the second power control signal from the microcomputer 12A may be reversed. Further, these transistors can be replaced by other switching elements such as a relay.

Third Exemplary Embodiment

In the first and second exemplary embodiments, the microcomputer of the first unit continues its operation, so that the electric power consumption thereof is hardly neglected.

Thus, in a third exemplary embodiment, a supply of a power not only to a second control unit, but also to a first control unit is supposed to be completely interrupted, and the supply of the power is supposed to be assuredly resumed from the interrupted state by an operation of a switch.

Figure 3:
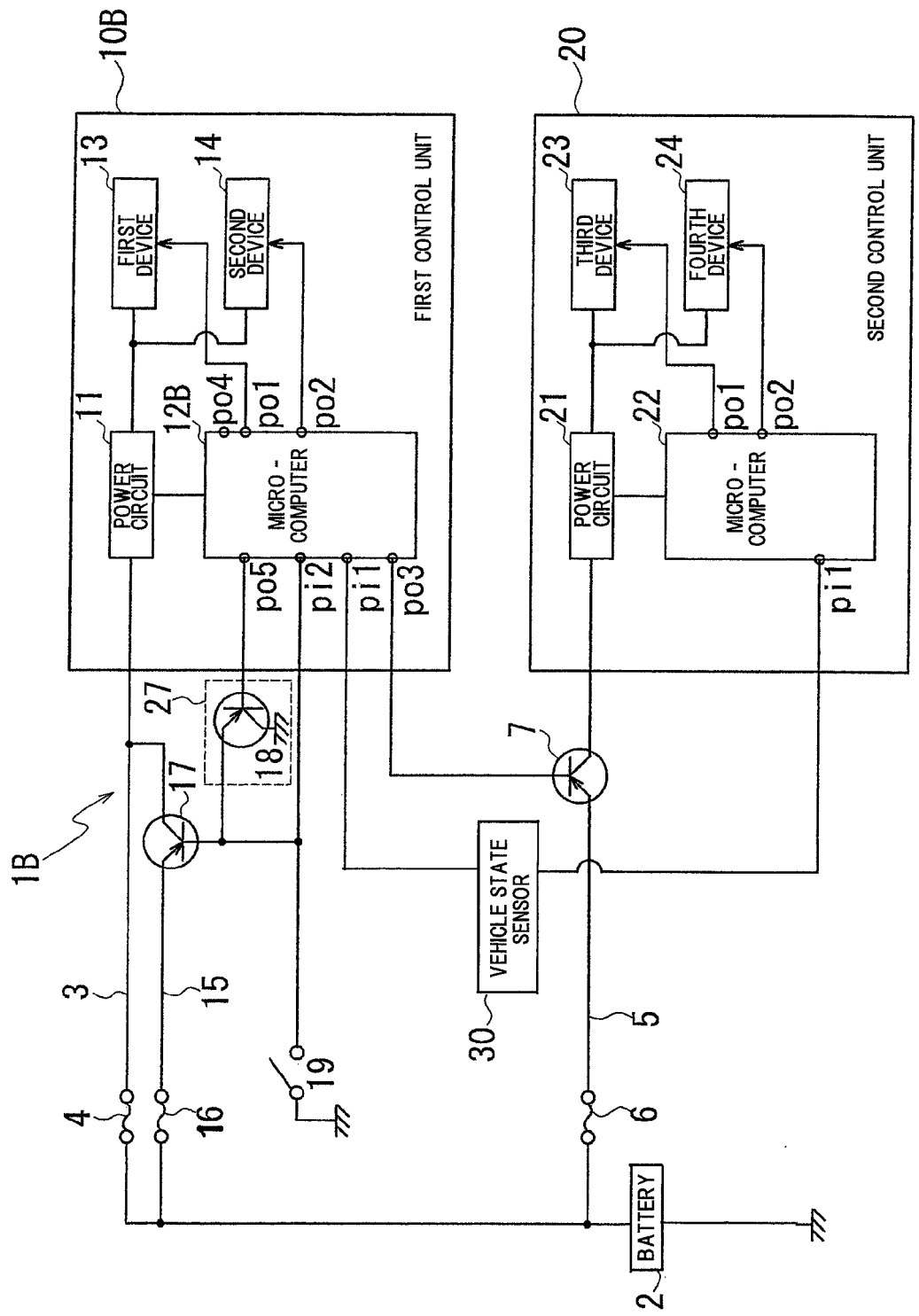
FIG. 3 is a block diagram showing a third exemplary embodiment of the present invention.

FIG. 3 is a block diagram showing the third exemplary embodiment. Here, a control system 1B for a vehicle includes a first control unit 10B having a power circuit 11 and a microcomputer 12B provided with a first device 13 and a second device 14 set as control objects and a second control unit 20 having a power circuit 21 and a microcomputer 22 provided with a third device 23 and a fourth device 24 set as control objects.

Between the first control unit 10B and a battery 2, two power supply lines 3 and 15 are set. One power supply line 3 connects the battery 2 to the power circuit 11 through a detachably attached fuse 4. The other power supply line 15 connects the battery 2 to the power circuit 11 through a sub-fuse 16 and a transistor 17 provided in order from the battery 2 side.

The second control unit 20 is connected to the battery 2 by a power supply line 5 having a fuse 6 and a transistor 7. A structure of the second control unit 20 is the same as that of the first exemplary embodiment.

The transistor 7 is turned on or off by a power control signal from the microcomputer 12B of the first control unit 10B.

In the first control unit 10B, an emitter of the transistor 17 is connected to the sub-fuse 16 side and a collector is connected to the power circuit 11 side. Then, a base of the transistor 17 can be grounded through an external switch 19 and is connected to a second input terminal pi2 of the microcomputer 12B.

The external switch 19 is installed in the vicinity of a door so as to be operated outside the vehicle.

The base of the transistor 17 can be further grounded through a transistor 18 forming a self-holding circuit 27. In the transistor 18, a base is connected to a fifth output terminal po5 of the microcomputer 12B and an emitter is connected to the base of the transistor 17 and a collector is grounded The transistor 17, the transistor 18 and the external switch 19 are ordinarily turned off.

A third output terminal po3 of the microcomputer 12B outputs the power control signal to a base of the transistor 7 of the second control unit 20.

Other inner structures of the first control unit 10B are the same as those of the first control unit 10 of the first exemplary embodiment. Further, to a first input terminal pi1 of the microcomputer 12B, a vehicle state sensor 30 is connected.

In the present exemplary embodiment, when the vehicle is transported or the vehicle is parked for a long period, the fuse 4 of the power supply line 3 is detached to interrupt the supply of the power to the first control unit 10B. Namely, since the transistor 17 is ordinarily tuned off, the power from the battery 2 is not supplied to the power circuit 11 even through the power supply line 15 having the sub-fuse 16.

Accordingly, since the microcomputer 12B does not operate, a level of the third output terminal po3 as the power control signal is not set to L, so that the transistor 7 is also tuned off. Thus, the supply of the power to both the first control unit 10B and the second control unit 20 is completely interrupted.

Thus, since any of the first device 13 and the second device 14, and the third device 23 and the fourth device 24 does not function, the electric power consumption of the battery 2 can be suppressed to a minimum.

Under this state, for instance, when the first device 13 is supposed to be a keyless entry device as described above, since a keyless function does not operate, a driver cannot get on the vehicle.

Here, when the vehicle is desired to be temporarily driven, the external switch 19 is turned on. Thus, since the transistor 17 is turned on with the base grounded, the power circuit 11 is connected to the battery 2 through the power supply line 15.

As described below, since the power supply state is returned again to the power interrupted state after a prescribed time elapses, as the external switch 19, an automatic return type push switch is more preferable than a position holding type switch.

When the power is supplied to activate the microcomputer 12B, since the microcomputer 12B takes a state that the second input terminal pi2 is in a grounded state (L) as a trigger to set the fifth output terminal Po5 to L, the transistor 18 is turned on to ground the base of the transistor 17. As a result, since a turning on state of the transistor 17 is self-held, even when the external switch 19 is turned off, the power is continuously supplied to the first control unit 10B.

Then, the microcomputer 12B sets the keyless entry device as the first device 13 to a stand-by state. Then, when a condition is established, for instance, a request is received from a keyless terminal, a lock of a door is unlocked. Thus, the driver can get on the vehicle to drive the vehicle.

While the microcomputer 12B of the first control unit 10B operates, depending on a detecting state of the vehicle state sensor 30, the transistor 7 is turned on so that the power may be also supplied to the second control unit 20.

Further, the microcomputer 12B returns the fifth output terminal po5 to H when the prescribed time elapses after the microcomputer 12B sets the fifth output terminal po5 to L.

The above-described prescribed time is set depending on a purpose, for instance, to limit a waiting time of the keyless entry device.

When the fifth output terminal po5 is set to H, the transistor 18 is turned off. At this time, since the external switch 19 is also turned off, the transistor 17 is turned off. Since the fuse 4 is kept detached, both the power supply lines 3 and 15 are not electrically conducted to interrupt a connection of the power circuit 11 to the battery 2. The first control unit 10B is returned again to a completely interrupted state of the power together with the second control unit 20.

In the present exemplary embodiment, when the first control unit 10B is corresponding to a first control unit, the power supply line 3 is corresponding to a first power supply line, the power supply line 15 is corresponding to a second power supply line, and the transistor 17 is corresponding to a first switch part. Further, the second control unit 20 is corresponding to a second control unit, and the transistor 7 is corresponding to a second switch part.

Further, the transistor 18 is corresponding to a control switch to form a self-holding circuit.

The third exemplary embodiment is formed in such a way as described above. The two power supply lines 3 and 15 are set to the first control unit 10B. When the vehicle is transported or the vehicle is parked for a long period, the fuse 4 of the power supply line 3 is detached, so that the supply of the power to the first control unit 10B can be completely interrupted. Accordingly, the electric power consumption including a consumption by the microcomputer 12B can be assuredly reduced.

Even under a state that the power is interrupted as described above, when an on-signal is sent to the transistor 17 from the external switch 19, the power is supplied to the first control unit 10B. Accordingly, when the external switch 19 is merely operated so as to meet a temporary necessity, the supply of the power can be easily resumed.

Especially, since the self-holding circuit 27 controlled by the microcomputer 12B provided in the control unit 10B is attached to the transistor 17, even when the automatic return type push switch is used as the external switch 19, the transistor 17 is not turned off by disengaging a finger from the external switch 19 and a state that the power is permitted to be supplied to the control unit 10B is maintained.

Since the transistor 17 is turned on by grounding the base by the external switch 19 and the self-holding circuit 27 merely keeps a grounded state of the base of the transistor 17 through the transistor 18, the structure is simple.

Further, the microcomputer 12B is set in such a way that when the prescribed time elapses after the supply of the power is permitted by the transistor 17, the microcomputer 12B finishes a self-holding state to interrupt the supply of the power to the first control unit 10B. Thus, when the power is supplied only during a period that the external switch is pushed, there is a fear that the power may be possibly interrupted before an operation sequence is finished in the microcomputer 12B. As compared therewith, after the operation sequence is completely finished, the supply of the power to the first control unit 10B is completely interrupted. In addition to the elapse of the prescribed time, when other conditions are established, the self-holding state may be finished.

The transistor 7 installed in the power supply line 5 to the second control unit 20 is controlled by the microcomputer 12B of the first control unit 10B. When the supply of the power to the first control unit 10B is interrupted, the transistor 7 interrupts the supply of the power to the second control unit 20. Accordingly, the interruption of the power to all the control units is realized only by detaching the fuse 4 of the power supply line 3.

Further, even when the power is supplied to the first control unit 10B, since the microcomputer 12B permits or interrupts the supply of the power to the second control unit 20 depending on the state of the vehicle, an effect of reducing the electric power consumption is large.

In the transistor 17, the PNP type may be replaced by the NPN type as in the transistor 7. In that case, the on-signal from the external switch 19 is not set to a ground level, but to an H level. Then, the transistor 18 connects the base of the transistor 17 to an H level in accordance with a turning on operation thereof, or a signal of an H level may be directly sent to the base of the transistor 17 from the microcomputer 12B. Further, the transistors 17 and 18 may take other forms such as a relay as switching elements.

Further, the external switch 19 may be also used as a door lock/unlock button in the keyless entry device. When the first device 13 of the first control unit 10B is the keyless entry device, if the external switch (the door lock/unlock button) is pushed even during the interruption of the power, the door is unlocked, for instance, under a condition that a smart key is possessed to make a security communication.

Further, in the exemplary embodiments respectively, examples are described in which the control system 10 for a vehicle includes the two units having the first unit 10 (10A, 10B) and the second control unit 20. However, when the control system for a vehicle includes more control units, the switch parts corresponding to the transistor 7 of the second control unit 20 are set in other control units after a third control unit. Then, the power control signals which respectively turn on or off the switch parts may be outputted from the microcomputer 12 (12A, 12B) of the first control unit at the same time in accordance with the state of the vehicle, or in accordance with properties of the control objects of the control units respectively.

On the contrary, especially, in the third exemplary embodiment, the second control unit 20 is omitted, so that the control system for a vehicle can be formed in which the power is controlled only for the first control unit 10B as an object.

In the exemplary embodiments respectively, the transistor 7 is shown in the drawing with an arrangement so as to be externally attached to the second control unit 20. However, depending on a request for mounting, the transistor 7 may be included and integrated in the first control unit 10 (10A, 10B) or in the second control unit 20. Similarly, especially in the third exemplary embodiment, the self-holding circuit 27 and the transistor 17 shown in the drawing with an arrangement so as to be externally attached to the first control unit 10B may be included and integrated in the first control unit 10B.

What is claimed is:

1. A control system for a vehicle including:
   a battery;
   a first control unit configured to receive a power supplied from the battery, and configured to control a first control object which is mounted on the vehicle;
   and an interrupting unit configured to interrupt a supply of the power to the first control unit from the battery,
   wherein a first switch part is provided between the battery and the first control unit which receives a resumption request signal when the supply of the power to the first control unit is interrupted by the interrupting unit to permit the power to be supplied to the first control unit from the battery.

2. The control system for a vehicle according to claim 1, wherein: the interrupting unit includes a vehicle state determining unit configured to determine a state of the vehicle; and the interrupting unit outputs an interrupting signal to the first switch part to interrupt the supply of the power to the first control unit from the battery or outputs the resumption request signal to the first switch part to permit the power to be supplied, in accordance with the state of the vehicle.

3. The control system for a vehicle according to claim 2, wherein the vehicle state determining unit is a microcomputer provided in a constant power supply control unit to which the power is constantly supplied.

4. The control system for a vehicle according to claim 3, wherein the constant power supply control unit controls a second control object which is different from the first control object.

5. The control system for a vehicle according to claim 4, wherein the constant power supply control unit includes: a power circuit configured to generates an operating power of the second control object including a prescribed control object; and a local switch provided between the power circuit and the second control object; and the microcomputer outputs a local interrupting signal to the local switch to interrupt the supply of the power to the prescribed control object from the power circuit or outputs a local resumption request signal to the local switch to permit the power to be supplied to the prescribed control object, in accordance with the state of the vehicle.

6. The control system for a vehicle according to claim 1, wherein: the battery is connected to the first control unit by a first power supply line; and the first switch part is installed in a second power supply line which connects the battery to the first control unit in parallel with the first power supply line.

7. The control system for a vehicle according to claim 6, wherein: the interrupting unit is a fuse detachable and installed in the first power supply line; the first switch part includes an external switch configured to output the resumption request signal; and under a state that the fuse is detached to interrupt the supply of the power from the battery to the first control unit by the first power supply line, the first switch part is allowed to permit the supply of the power by the second power supply line in accordance with the resumption request signal form the external switch.

8. The control system for a vehicle according to claim 7, wherein: the external switch is provided at a part where the external switch can be operated outside the vehicle.

9. The control system for a vehicle according to claim 8, wherein: the external switch is a door lock/unlock button in a keyless entry device.

10. The control system for a vehicle according to claim 7, wherein the first switch part includes a self-holding circuit controlled by a microcomputer provided in the first control unit; and when the first switch part receives the resumption request signal to permit the power to be supplied, the first switch part continues a power supply permission state by a self-holding function even when the resumption request signal disappears afterward.

11. The control system for a vehicle according to claim 10, wherein the microcomputer is set so that when a prescribed time elapses after the supply of the power is permitted by the first switch part, the microcomputer finishes the self-holding function to interrupt the supply of the power to the first control unit.

12. The control system for a vehicle according to claim 10, wherein: the first switch part is a transistor; the external switch grounds a base of the transistor to turn on the transistor in accordance with the resumption request signal; and the self-holding circuit is formed with a control switch which is turned on by the microcomputer to hold the base of the transistor in a grounded state.

13. The control system for a vehicle according to claim 10, further comprising:
   a second control unit configured to control a second control object that is different from the first control object; and a second switch part installed in a power supply line which connects the battery to the second control unit,
   wherein: the second switch part is controlled by the microcomputer of the first control unit; and when the supply of the power to the first control unit is interrupted, the second switch part interrupts the supply of the power to the second control unit.

14. The control system for a vehicle according to claim 13, wherein when the power is supplied to the first control unit, the microcomputer permits or interrupts the supply of the power to the second control unit in accordance with the state of the vehicle.

* * * * *